United States Patent [19]

Madden, II et al.

[11] Patent Number: 4,944,917
[45] Date of Patent: Jul. 31, 1990

[54] USE OF THIOSULFATE SALT FOR CORROSION INHIBITION IN ACID GAS SCRUBBING PROCESSES

[75] Inventors: Patrick C. Madden, II, Whippany; Z. Andrew Foroulis, Mendham, both of N.J.

[73] Assignee: Exxon Research and Engineering Company, Florham Park, N.J.

[21] Appl. No.: 138,630

[22] Filed: Dec. 28, 1987

Related U.S. Application Data

[63] Continuation-in-part of Ser. No. 6/912,258, Sep. 29, 1986, abandoned, which is a continuation-in-part of Ser. No. 6/503,061, Jun. 10, 1983, abandoned, which is a continuation-in-part of Ser. No. 06/398,077, Jul. 14, 1982, abandoned.

[51] Int. Cl.$^5$ .............................................. C23F 11/06
[52] U.S. Cl. ...................................... 422/13; 252/156; 252/189; 252/190; 252/387; 252/545; 422/7; 422/12; 422/14; 423/223; 423/228
[58] Field of Search ....................... 422/7, 12-14; 423/223, 228; 252/156, 189, 190, 387, 545

[56] References Cited

U.S. PATENT DOCUMENTS 2,780,583  2/1957  Skei et al. ........................ 422/7
4,112,051  9/1979  Sartori et al. ...................... 423/223
4,405,557  9/1983  Sartori et al. ...................... 423/223
4,405,578  9/1983  Sartori et al. ...................... 423/223

OTHER PUBLICATIONS

Shalaby et al., "Corrosion Fatigue Behavior of Alloy 600 in High-Satinity Brine," Corrosion, 44(12), pp. 905-915, Dec. 1988.

Arries et al., Bull. Cercle Etud. Metaux., 15, (15-16), 1988, Cont.:27th Special Steels Cont. & Materials Used in Energy, St. Etienre, FR.

Cottis et al., "The Role of Inclusions in Corrosion Fatigue Crack Initation in Q1N," Eng. Materials Adv. Ser. Ltd., Cont.:Fatigue '87, vol. 1, Charlottesville, VA., 28 Jun. 1987.

*Primary Examiner*—Robert J. Warden
*Assistant Examiner*—Timothy M. McMahon
*Attorney, Agent, or Firm*—Henry E. Naylor

[57] ABSTRACT

Disclosed is a method for inhibiting corrosion of metal surfaces in contact with H$_2$S-containing acid gases streams and aqueous amine scrubbing solutions, which method comprises: contacting the H$_2$S-containing stream with amine scrubbing solution in the presence of an effective amount of an ammonium or alkali-metal thiosulfate salt and an effective amount of sulfide and/or hydrosulfide ions.

10 Claims, 1 Drawing Sheet

USE OF THIOSULFATE SALT FOR CORROSION INHIBITION IN ACID GAS SCRUBBING PROCESSES

CROSS REFERENCE TO RELATED APPLICATIONS

This application is a continuation-in-part of U.S. patent application Ser. No. 912,258, now abandoned filed Sept. 29, 1986, which is a continuation-in-part of U.S. patent application Ser. No. 503,061, filed June 10, 1983, now abandoned, which is a continuation-in-part of U.S. patent application No. 398,077, filed July 14, 1982, now abandoned.

BACKGROUND OF THE INVENTION

This invention is related to a process for inhibiting corrosion of metal surfaces which are in contact with $H_2S$-containing acid gas streams treated with an aqueous amine-containing scrubbing solution. Corrosion is inhibited by use of a thiosulfate salt in the presence of sulfide or hydrosulfide ions.

The sweetening of natural and synthetic gases has been practiced for many years. Typically, this has involved the removal of acidic compounds such as $CO_2$, $H_2S$ and COS by absorption of the acid gases in a liquid absorbent medium. Various aqueous, absorbing or scrubbing solutions have been utilized to remove the acidic components. Such solutions include those containing alkanolamines, sulfolane (2,3,4,5-tetrahydro-thiophene-1,1-dioxide); 2,3,4,5-tetrahydrothiophene-1,1-dioxide with diisopropanol amine and potassium carbonate solutions. Each of these systems experiences corrosion of metal surfaces in contact with the scrubbing solution, which may be attributable to one or more of the following: decomposition of the scrubbing solution; reaction of the acidic components of the gas and the absorbent; and direct attack by the acidic components in the gases. This corrosion may occur throughout the entire gas treating system on metal surfaces in contact with the solutions and the acid gas.

U.S. Pat. No. 3,887,330 discloses a method for preventing sulfur corrosion of ferrous materials in pipelines wherein ammonium polysulfide as an aqueous solution is mixed with an essentially non-aqueous sulfur hydrocarbon slurry. The ammonium polysulfide may be externally added or may be formed by reaction of ammonium hydrosulfide with free sulfur in the slurry.

U.S. Pat. No. 3,438,680 describes a similar method for transporting sulfur particles through a pipeline wherein sulfur particles are intimately mixed with an aqueous solution of a polysulfide salt to form a slurry, the slurry is pumped through a pipeline and the sulfur particles are removed from the aqueous solution. The polysulfide salt used as carrier is reported to prevent corrosion.

Use of alkali metal sulfides per se as corrosion inhibitors in ammonium nitrate-urea deicer compositions is reported in U.S. Pat. No. 3,297,577.

For some gas treating processes, i.e., those characterized as hot carbonate processes, it is reported that hydrogen sulfide gas can inhibit corrosion. See Bienstock et al., *Corrosion*, 17, 571 (1961), Benson et al., *Petroleum Refiner*, 39, 127 (1960) and a pamphlet from the U.S. Department of the Interior Bureau of Mines, "Removing Hydrogen Sulfide By Hot Potassium Carbonate Absorption", by Field et al. (1954). However, for most gas treating processes using aqueous amine solutions, $H_2S$ per se is not an effective corrosion inhibitor. Process designs of this type are well known to limit the acid gas content of such solutions in order to minimize corrosion.

SUMMARY OF THE INVENTION

In accordance with the present invention, there is provided a method for inhibiting corrosion of metal surfaces in contact with $H_2S$-containing acid gas streams and aqueous amine scrubbing solutions, which method comprises: contacting the $H_2S$-containing stream with an amine scrubbing solution in the presence of an effective amount of an ammonium or alkali-metal thiosulfate salt and effective amount of sulfide and/or hydrosulfide ions. Preferably the ammonium or alkali-metal thiosulfate is selected from those represented by the formulae:

$$(NH_4)_2S_2O_3 \text{ or } (M)_2S_2O_3$$

wherein M is an alkali metal such as Na or K.

Alternatively, sulfur-containing compositions, for example sulfites, that can be converted in-situ to the thiosulfate, may be used.

In preferred embodiments of the present invention, the resulting polysulfide from the reaction of thiosulfate with sulfide and/or hydrosulfide ions, expressed as weight of total elemental sulfur in the scrubbing solution, may range from about 0.01 to about 6 weight percent, preferably from about 0.02 to about 3 weight percent, and more preferably from about 0.03 to 1 weight percent.

DETAILED DESCRIPTION OF THE INVENTION

Figure 1:
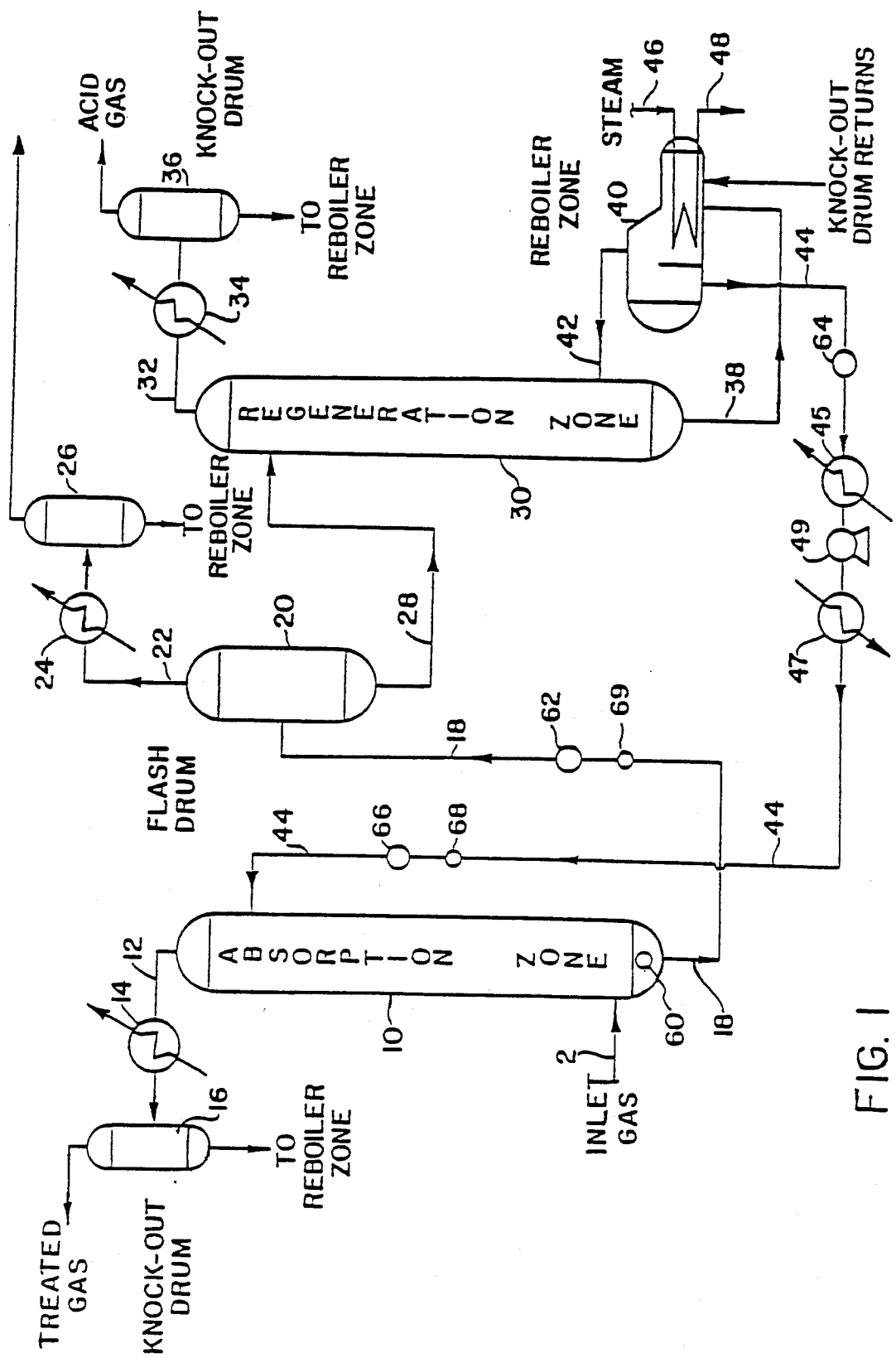
FIG. 1 is a simplified process flow diagram of a typical gas treating unit.

Acid gas-containing streams suitable for treatment herein are those streams which contain $H_2S$. Other acid gases may also be present, such as those selected from $CO_2$, $SO_2$, $SO_3$, $CS_2$, HCN, COS and the oxygen and sulfur derivatives of $C_1$ to $C_4$ hydrocarbons as they frequently appear in gaseous mixtures. Except for $CO_2$ and $H_2S$, these gases normally are present only in small amounts within a gaseous mixture or feed. Such acid gas-containing gaseous streams can result from the processing of oil, chemicals, and coal.

While it is believed that the subject invention will have applicability to a wide variety of acid gas scrubbing solutions, the present invention is especially applicable to aqueous amino scrubbing solutions, particularly alkanolamines (aminoalkanols), and more particularly to sterically-hindered amine scrubbing solutions. The subject invention is also applicable to amine-promoted alkaline salt scrubbing solutions.

For amine-promoted aqueous alkali metal salt scrubbing systems, the alkali metal salt can be selected from the group consisting of alkali metal bicarbonates, carbonates, hydroxides, borates, phosphates and mixtures thereof. The concentration of the alkali metal compound is preferably about 10 to about 40 weight percent of the entire weight of the solution. Most preferably, potassium carbonate is used in a concentration of about 20 to 35 weight percent.

Preferably, the processes of this invention are carried out at temperatures of 35° to 150° C., more preferably 60° to 130° C.

Non-limiting examples of amino compounds suitable for use herein for removing acid gases are alkanolamines such as monoethanolamine (MEA), diethanolamine (DEA), dipropanolam;ine (DPA), hydroxy ethoxyethylamine (DGA), diisopropanolamine (DIPA), methyldiethanolamine (MDEA), diethylmonoethanolamine (DEAE), and the like. Preferred is monoethanolamine. Also suitable is 2-piperidine ethanol (PE), and the like.

In addition, the amino compounds can be sterically hindered, such as those disclosed in U.S. Pat. Nos. 4,471,138; 4,405,586; 4,405,851; and 4,112,050, all of which are incorporated herein by reference. By sterically hindered, we mean those amino compounds having a degree of steric hindrance such that the cumulative $-E_s$ value (Taft's steric hindrance constant) is greater than about 1.75 as calculated from the values given for primary amines in Table V in D. F. Detar, *Journal of Organic Chemistry*, 45, 5174 (1980).

Amino compounds suitable for use herein have a $pK_a$ value at 20° C. greater than 8.6 for this use, preferably greater than about 9.5, and more preferably for amino ether alcohols the $pK_a$ value will range between about 9.5 and about 10.6. If the $pK_a$ is less than 8.6 the reaction with $H_2S$ is decreased, whereas if the $pK_a$ of the amino compound is much greater than about 10.6, an excessive amount of steam is required to regenerate the scrubbing solution. Also, to insure operational efficiency with minimal losses of the amino compound, the amino compound preferably has a relatively low volatility. For example, the boiling point of the amino compound (at 760 mm) is typically greater than about 180° C., preferably greater than 200° C., and more preferably greater than 225° C.

The aqueous amino scrubbing solutions generally have a concentration of amino compound of about 0.1 to 6 moles per liter of the total solution, and preferably 1 to 4 moles per liter, depending primarily on the specific amino compound employed.

The scrubbing solution may include a variety of additives typically employed in selective gas removal processes, e.g., antifoaming agents, anti-oxidants, and the like. The amount of these additives will typically be in the range that they are effective, i.e., an effective amount.

Thiosulfate salts which are the subject of the present invention are the soluble ammonium or alkali metal thiosulfate salts represented by the general formulae:

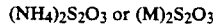

$(NH_4)_2S_2O_3$ or $(M)_2S_2O_3$ wherein M is an alkali metal such as sodium or potassium, preferably sodium. The most preferred thiosulfate salt is ammonium thiosulfate.

The thiosulfate salts may be added to the aqueous medium externally or in the form of a precursor such as a sulfite salt. Non-limiting examples of such sulfite salts which may be used herein include ammonium and alkali metal sulfites.

The amount of the thiosulfate salt used in the aqueous scrubbing solution is an amount which is effective to inhibit corrosion. This amount is such that the resulting polysulfide expressed as total weight of elemental sulfur, will range between about 0.01 to about 6 weight percent, preferably from about 0.02 to about 3 weight percent, and more preferably from about 0.03 to 1 weight percent.

The corrosion inhibition properties of the thiosulfate salt are dependent on the presence of an effective amount of sulfide or hydrosulfide ion. By effective amount we mean that minimum amount of thiosulfate salt and sulfide and/or hydrosulfide ions needed to result in a polysulfide concentration such that the above minimum elemental sulfur requirement is met.

For hot carbonate application, the solvent employed in the solution herein is preferably water, but may also be a mixture of water and a cosolvent such as pipecolinic acid, as described above, or a mixture of water and a physical absorbent such as sulfolane or merely the physical absorbent for the amine application.

It is noted that the acid gases are usually contacted with the scrubbing solution at elevated temperatures, such as at the boiling point of the scrubbing solution or higher. The stability of the resulting polysulfide film, produced by the reaction of thiosulfate with sulfide and/or hydrosulfide, can be improved if desired or necessary by treating the metal surfaces prior to contact with the acid gas and amine scrubbing solution. To accomplish this, the metal surfaces are treated with a sulfur-containing inert gas, preferably an $H_2S/N_2$ mixture; an effective amount of thiosulfate, and the amine scrubbing solution, for an effective amount of time. That is, for a time long enough to produce a substantially uniform polysulfide film over the entire metal surfaces. This time will usually range from about two hours to several days at elevated temperatures, depending on the severity of the corrosion conditions. Metal surfaces which are protected in accordance with this instant invention are generally those ferrous alloys used in gas treating equipment. In a preferred embodiment, the scrubbing solution containing the thiosulfate salt is circulated with the $H_2S/N_2$ gaseous mixture at a temperature of about 120° C., for up to one week.

The following examples will demonstrate the effectiveness of the present corrosion inhibitor in reducing the corrosion rate of acid gas-containing aqueous alkaline solutions below that obtainable in the absence of a corrosion inhibitor. In the examples all parts and percentages are by weight and all temperatures in degrees Celsius unless otherwise noted. In addition, the corrosion rates expressed in the examples represent values obtained from water washing, not honing.

EXAMPLE 1

External Addition of Mixture of Sulfide Salt and Elemental Sulfur for Hot Carbonate Process Batch corrosion tests were conducted to determine the effectiveness of various corrosion inhibitors in reducing corrosion. The following tests were conducted using the absorbing solutions (Solutions A and B) comprising the ingredients listed in Table I. Solution A is a control containing no corrosion inhibitor whereas Solution B is representative of the invention. Each solution was tested for corrosion by suspending either a carbon steel test coupon, a stainless steel test coupon, or a carbon steel test probe in each solution and continuously bubbling through the solution 100% by volume $CO_2$ for 140 hours at a rate of 500 cc per minute at atmospheric pressure at the indicated temperature, which represents the boiling point of the solution. These conditions simulate corrosive conditions in the absorber, the regenerator and in other equipment used in a typical gas-treating operation. The corrosion rats, in mm per year, are indicated in Table I.

TABLE I

| Ingredients of Solution (Weight Percent) | Solution A (Control) | Solution B (Invention) |
|---|---|---|
| Potassium Carbonate | 28 | 28 |
| N-cyclohexyl-1,3-propanediamine | 7 | 7 |
| Pipecolinic Acid | 7 | 7 |
| Sodium Sulfide | 0 | 7.4[a] |
| Elemental Sulfur | 0 | 0.5 |
| Water | 58 | 50.1 |
| Boiling Points of Solution (°C.) | 103 | 107 |
| Corrosion Rates (mm per year) | | |
| Carbon Steel (Coupon) | 18.796–19.761 | nil |
| Carbon Steel (Probe) | 19.939 | 0.020–0.041 |
| Stainless Steel (Coupon) of Type 304 Composition | 0.183 | <0.0025 |
| Stainless Steel (Coupon) of Type 316 Composition | 0.206 | <0.0025 |

[a] If $Na_2S$ is replaced by $Na_2S.9H_2O$, 10% is employed in the solution rather than 7.4%.

It can be seen that the combination of soluble sulfide and elemental sulfur reduces the corrosion rate below that which is obtained when no inhibitor is employed.

EXAMPLE 2

External Addition of Polysulfide Salt for Hot Carbonate Process

A solution of polysulfide, designated herein as Solution X, was prepared by first dissolving in 3146 g. of distilled water a total of 4 g. of solid sodium hydroxide and 90 g. of $Na_2S.9H_2O$ to this solution were slowly added 45 g. of flowers of sulfur, and the resultant solution was mixed in the absence of air. The resulting solution was used to prepare several test solutions having the following ingredients:

| Ingredients (% by Weight) | Solution C | D | E | F |
|---|---|---|---|---|
| Potassium Carbonate | 28 | 28 | 28 | 28 |
| N-cyclohexyl-1,3-propanediamine | 7 | — | — | — |
| Pipecolinic Acid | 7 | — | — | — |
| N-secondary butyl glycine | — | 6 | 6 | 6 |
| N-secondary butyl-N-methyl glycine | — | 6.6 | 6.6 | 6.6 |
| Solution X | 35 | 35 | 10 | 20 |
| Water | 23 | 24.4 | 49.4 | 39.4 |

Each of the above solutions was tested for corrosion inhibition by suspending a carbon steel test coupon in the test solution and by bubbling continuously for up to six weeks either 100% $CO_2$ or a mixture of 10% $CO_2$ and 90% $H_2$ by volume through the solution at a rate of 500 cc per minute at atmospheric pressure and at the boiling point of each solution as indicated in Table II.

The corrosion rates of each solution, in mm per year, were measured after one week, two weeks, three weeks, and four weeks, and for one solution after six weeks, with the results indicated in Table II.

TABLE II

| Test Solution | Temperature (°C.) | Gas Composition | 1 Week | 2 Weeks | 3 Weeks | 4 Weeks | 6 Weeks |
|---|---|---|---|---|---|---|---|
| C | 108 | $CO_2$ | <0.025 | <0.025 | <0.025 | <0.025 | |
| D | 108 | $CO_2$ | <0.025 | <0.025 | <0.025 | <0.025 | |
| D | 102 | 10% $CO_2$ 90% $H_2$ | <0.025 | <0.025 | <0.025 | <0.025 | <0.025 |
| E | 102 | 10% $CO_2$ 90% $H_2$ | <0.025 | <0.025 | <0.025 | <0.025 | |
| F | 102 | 10% $CO_2$ 90% $H_2$ | <0.025 | <0.025 | <0.025 | <0.025 | |
| A (Control of Example 1) | 103 | $CO_2$ | 18.796–19.761 | | | | |

The data in Table II show that the corrosion was essentially nil for all solutions tested, as opposed to the control (Solution A of Example 1) which shows substantial corrosion after only 140 hours.

EXAMPLE 3

External Addition of Polysulfide Salt for Amine Scrubbing Process

Two test solutions having the following ingredients were prepared:

| Ingredients (% by Weight) | Solution G (Control) | H (Invention) |
|---|---|---|
| Monoethanolamine | 30 | 30 |
| Solution X of Example 2 | 0 | 35 |
| Water | 70 | 35 |

Each of the above solutions was subjected to $N_2$ circulation for 14 hours at room temperature and was then tested for corrosion inhibition by suspending a carbon steel test coupon in the test solution and by bubbling continuously at 103° C. for 8 days 100% by volume $CO_2$ at 0.1 mPa through the solution at a rate of 500 cc per minute.

The corrosion rates of each solution, in mm per year, were measured after 8 days, with the results indicated in Table III.

TABLE III

| Test Solution | Corrosion Rate (mm/year) |
|---|---|
| G (Control) | 0.51 |
| H | 0.002 |

The data show that corrosion was essentially nil for solution H of this invention as opposed to the control solution G which shows substantial corrosion.

EXAMPLE 4

External Addition of Polysulfide Salt for Amine Scrubbing Process with $CO_2$ and $H_2S$ The solutions G and H of Example 3 were employed as follows: Both solutions G and H were subjected to $N_2$ circulation for 14 hours at room temperature before testing. In addition, for building a better omjobotpr film, solution H was heated in a $N_2$ atmosphere to 121° C. and maintained at this operating temperature for 3 days prior to introducing the corrosive gases. Each solution was tested for corrosion inhibition by suspending a carbon steel test coupon in the test solution and by bubbling continuously at 121° C. for 1.7 days a stream of 60% CO$_2$, 1% H$_2$S and 39% N$_2$ by volume at 0.1 mPa through the solution at a rate of 500 cc per minute.

The corrosion rates of each solution, in mm per year, were measured after 8 days, with the results indicated in Table IV.

TABLE IV

| Test Solution | Corrosion Rate (mm/year) |
|---|---|
| G (Control) | 0.178 |
| H | nil |

The data show that the corrosion was much greater in the control solution (G) than in the solution (H) containing the corrosion inhibitor of this invention.

Similar results to those observed in Example 3 were obtained using a passivation and corrosion unit containing an absorption zone equipped with means for solution recirculation similar to the unit of FIG. 1 discussed below but having no regeneration unit.

Thiosulfate ion can react with the H$_2$S in amine solution to form polysulfide according to the following reversible chemical reaction.

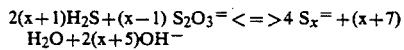
$$2(x+1)H_2S + (x-1)S_2O_3^= <=> 4 S_x^= + (x+7) H_2O + 2(x+5)OH^-$$

Thus, the amount of polysulfide found in equilibrium with thiosulfate in solution depends on the temperature, the amount of dissolved H$_2$S (or sulfide), and the pH of the solution.

EXAMPLE 5

Addition of Ammonium Thiosulfate to MEA Solution to Maintain Previously Established Polysulfide Film in Large Pilot Plant A test was conducted in a large (144 gallons inventory) gas treating pilot plant (GTU) to confirm that a thiosulfate salt added to MEA solution would react with H$_2$S in the feed gas to form polysulfide and maintain a previously established iron polysulfide film. Carbon steel corrosion coupon data from this run are presented in Table V. The pilot plant was started up on day 1 and operated continuously until day 92. The end days indicated on the table were the days when corrosion coupons were removed from the unit, washed, and weighed. Washing removes loose corrosion products from the surface of the coupons but does not disturb the adherent inhibitor film, which often results in a slight increase in coupon weight. In most cases, the coupons were returned to the unit after weighing. All of the coupons were immersed in the most corrosive part of the pilot plant, the hot, rich solution.

The first two periods are baseline corrosion data taken at severe conditions without corrosion inhibition. Corrosion rates of 8-32 mils/year in 30 wt. % MEA were measured for coupons J90 and J91. Following this baseline period, a one-week "off-line" passivation was implemented using sodium tetrasulfide as the passivating agent. During this week, a 20 wt. % MEA solution containing 2000-8000 wppm polysulfide was circulated in the unit at approximately 250° F with no acid gas (CO$_2$ or H$_2$) present. This was followed by three weeks of "on-line" passivation, during which various levels of polysulfide were maintained in 20 wt. % MEA solution by continuous injection of sodium tetrasulfide solution. During this period, gas and solution rates were controlled such that total acid gas loading was less than 0.3 mol/mol. Following the on-line passivation periods, MEA strength was increased to 30 wt. % (on day 46) and solution acid gas loadings were pushed to 0.5 mol/mol to demonstrate commercial "step-out conditions."

As noted on the table, the change to more severe conditions had an immediate dramatic effect on the polysulfide level in solution, even though polysulfide addition was stopped on day 46. The increase from 1500 to 8000 ppm polysulfide was caused by the reaction of thiosulfate with the increased H2S in solution as follows:

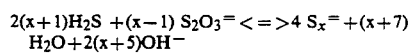
$$2(x+1)H_2S + (x-1) S_2O_3^= <=> 4 S_x^= + (x+7) H_2O + 2(x+5)OH^-$$

The drop in thiosulfate concentration as predicted by this equation is very close to the actual drop measured analytically.

On day 54, the complete solution inventory was drained from the unit and replaced with fresh 30 wt. % MEA containing no polysulfide or thiosulfate. On day 55, the unit was restarted at the same conditions established prior to the solution changout. During this last period, polysulfide was maintained by continuous injection of 50 wppm/hour of ammonium thiosulfate, which was converted to polysulfide by the above reaction.

To monitor corrosion, fresh carbon steel coupons were added at appropriate intervals throughout the test to allow accurate measurement of the background corrosion rates. During the first on-line period following off-line passivation, day 14 to day 28, the off-line passivated coupons, J18 and J97 showed a weight gain ("less-than zero" corrosion rate). This compares with 46.5 mils/year for the fresh coupon (K1) and 4.6 mils/year for J91, which had seen the baseline corrosion period prior to being passivated. Over the next several weeks, coupon J91 showed decreasing corrosion rates, with the exception of day 63 which was the first time it was ultrasonically washed. This indicates that even after its surface had been corroded, the passivation treatment (both on and off-line) was able to reach the surface and form the corrosion barrier.

As measured by the fresh coupon rates, the environment in the pilot plant was highly corrosive during essentially all of the three month run. Significantly, all of the passivated coupons maintained low corrosion rates during the high severity portion of the test through the action of ammonium thiosulfate. The off-line passivated coupons, J18 and J97, showed negligible corrosion rates throughout the run. The on-line passivated coupons, K1, K4, and K13, showed initial high corrosion during their first week on line, but had substantially reduced corrosion rates thereafter. The coupons added after day 46 were not passivated and showed corrosion rates of 20-60 mils/year during the same period. Apparently the unit operating severity was too high to obtain on-line passivation during this period.

Overall, addition of thiosulfate was effective in producing polysulfide on-line and maintaining the corrosion protection previously established with sodium tetrasulfide.

TABLE V

CORROSION COUPON DATA FROM HOT, RICH SECTION OF LARGE GAS TREATING PILOT PLANT

| | BASE | | PASSIVATION OFF-LINE | PASSIVATION ON-LINE | | | | STEP-OUT CONDITIONS | | |
|---|---|---|---|---|---|---|---|---|---|---|
| Period | | | | | | | | | | |
| Start Day | 1 | 7 | 14 | 21 | 28 | 35 | 46[3] | 55[5] | 63 | 77 |
| End Day | 7 | 14 | 21 | 28 | 35 | 46 | 53 | 63 | 77 | 92 |
| MEA, Wt. % | 30 | | 20 | 20 | 20 | 20 | 30 | 30 | 30 | 30 |
| $CO_2$ mol/mol | 0.22 | | — | .09 | .10 | .09 | .27 | .24 | .13 | .17 |
| $H_2S$ mol/mol | 0.25 | | — | .17 | .18 | .22 | .26 | .27 | .27 | .32 |
| Temperature, °F. | 260 | | 250 | 260 | 260 | 260 | 260 | 260 | 260 | 260 |
| Polysulfide, wppm | — | | 2000–8000 | 800 | 1200 | 1500 | 8000[4] | 100 | 1000[6] | 500 |
| $S_2O_3=$, Wt. % | — | | 0.4–1.5 | 1.8 | 2.0 | 2.5 | 1.9 | 0.2 | 1.1 | 1.4 |
| Chemical Added | — | | $Na_2S_4$ | $Na_2S_4$ | $Na_2S_4$ | $Na_2S_4$ | — | $(NH_4)_2 S_2O_3$ | $(NH_4)_2 S_2O_3$ | $(NH_4)_2 S_2O_3$ |
| Equivalent Polysulfide Addition Rate wppm/hr Total Inventory | — | | — | 20 | 30 | 50 | 0 | 50 | 50 | 50 |
| BASELINE | | | Mils/Year (Water Washed)[2] | | | | | Mils/Year (Ultrasonic Wash) | | |
| J90 | 8 | 32 | (Removed) | — | — | — | — | — | — | — |
| J91 | 11 | N/A | — | 4.6 | 3.3 | 0.4 | <0 | 12.5 | 1.2 | 0.4 |
| OFF-LINE PASSIVATED | | | | | | | | | | |
| J18 (Installed 9/29) | — | — | (1) | <0 | 1.3 | 0.5 | 1.3 | (Removed) | (Reinstalled) | 3.7 |
| J97 (Installed 9/29) | — | — | (1) | <0 | 0.2 | <0 | <0 | 1.9 | <0 | 0.3 |
| ON-LINE PASSIVATED | | | | | | | | | | |
| K1 | — | — | — | 46.5 | 2.1 | 0.1 | <0 | 3.9 | 0.6 | 0.4 |
| K4 | — | — | — | — | 38 | 3.4 | <0 | 2.2 | 1.7 | 4.7 |
| K13 | — | — | — | — | — | 16.6 | 5.8 | 2.6 | 2.5 | 0.6 |
| NOT PASSIVATED | | | | | | | | | | |
| K8 | — | — | — | — | — | — | 27.1 | 28.3 | 24.6 | 30.1 |
| K11 | — | — | — | — | — | — | — | 22.5 | 25.7 | 25.7 |
| K14 | — | — | — | — | — | — | — | 19.6 | 44.9 | 58.2 |
| K17 | — | — | — | — | — | — | — | — | 28.9 | 23.6 |
| K19 | — | — | — | — | — | — | — | — | — | 37.6 |

[1] Coupons exhibited a characteristic small weight gain associated with the formation of the inhibitor film on the metal surface.
[2] The water wash (or ultrasonic water wash) is intended to remove loose corrosion products from the coupons. Inhibitor film is strongly adherent and unaffected by water wash or ultrasonic bath.
[3] MEA added on day 46 to raise concentration to 30 wt. %.
[4] Polysulfide increase resulted from conversion of thiosulfate to polysulfide due to increase in sulfide ion ($H_2S$ loading).
[5] Solution drained on day 54 and replaced on day 55 with fresh 30 wt. % MEA without polysulfide. $(NH_4)_2 S_2O_3$ addition started on day 60.
[6] About the middle of this period, reboiler steam rate was doubled and polysulfide dropped as low as 10 wppm in response to the dramatically lower sulfide level. This transient was later reversed when steam rate was reduced on day 80 and polysulfide returned to the 400–600 ppm level.

A simplified schematic drawing of a typical acid gas treating unit which would be used for such tests is shown in FIG. 1. In this drawing, piping, equipment, instrumentation and valves not necessary for an understanding of the present invention have been omitted for clarity. In this figure, acid-containing gas enters absorption zone 10 through inlet 2 located near the base. Scrubbing or absorbing solution enters absorption zone 10 near the top through line 44. Absorption zone 10 may be a packed, trayed or similar type column in which the upwardly flowing gas stream and the downwardly flowing scrubbing solution are effectively contacted. After the removal of at least a portion of the acidic compounds from the gas stream, the gas stream exiting absorption zone 10 passes through line 12, condenser 14 and knock-out drum 16 for further processing (not shown). The absorbing solution enriched in acidic compounds passes from the base of absorption zone 10 through line 18 into flash zone 20. Vapor passes from flash zone 20 through line 22, condenser 24 and knock-out drum 26 for further treatment (not shown). The non-vaporized absorbing solution passes from flash drum 20 through line 28 into regeneration zone 30 wherein acidic compounds are stripped from the absorbing solution, passing out of zone 30 through line 32, condenser 34, and knock-out drum 36 for further processing (not shown). Absorbing solution from the base of regeneration zone 30 passes through line 38 into reboiler zone 40. A fraction of the absorbing solution entering reboiler zone 40 is vaporized and returned to regeneration zone 30 via line 42, while the remainder is returned to absorption zone 10 by line 44 after passing through cooler 45 and heater 47 before and after pump 49, respectively. Steam or other heat transfer material enters reboiler 40 through line 46 and exits through line 48.

As used hereinafter, scrubbing solution which has been stripped of acidic compounds is termed "lean" solution, while scrubbing solution which contains a significant quantity of absorbed acidic compound is "rich" solution. To conduct corrosion tests corrosion coupons 60 would be installed in the base of absorption zone 10 to measure the corrosion rate of the rich solution in absorption zone 10, while a corrosion probe and coupon assembly 62 would be installed in transfer line 18 to monitor the corrosion of rich solution being transferred to regeneration zone 30. Corrosion probe and coupon assemblies 64 in the hot lean solution and 66 in the cold lean solution would be installed in transfer line 44 to monitor the corrosion rate in the lean absorbing solution returned to the absorption zone. Corrosion tubing velocity sections 68 and 69 would be installed in lines 4 and 18, respectively, to measure the effect of increased velocity on the corrosion rate in the lean and rich solutions, respectively.

What is claimed is:

1. In a process for removing acidic gases from a gaseous stream containing H2S, wherein said gaseous stream is contacted with an amine-containing scrubbing solution at an elevated operating temperature, the improvement comprising adding an effective amount of an ammonium or metal thiosulfate salt thereby inhibiting corrosion of metal surfaces in contact with the acid gas stream containing the scrubbing solution.

2. The process of claim 1 wherein the thiosulfate salt is selected from those represented by the formula:

$(NH_4)_2S_2O_3$ or $(M)_2S_2O_3$ wherein M is an alkali metal selected from Na and K.

3. The process of claim 2 wherein the thiosulfate salt is ammonium thiosulfate.

4. The process of claim 1 wherein the amount of thiosulfate salt present is enough to provide from about 0.01 to 6 percent of the resulting polysulfide, based on the total amount of sulfur.

5. The process of claim 4 wherein the amount of thiosulfate salt is such as to provide from about 0.05 to 0.6 percent of the resulting polysulfide, based on the total amount of sulfur.

6. The process of claim 1 wherein the amino compound of the amine scrubbing solution is a sterically-hindered amine.

7. The process of claim 6 wherein the amino compound is an alkanolamine.

8. The process of claim 7 wherein the alkanolamine is monoethanolamine.

9. The process of claim 1 wherein an alkaline material is also present.

10. The process of claim 9 wherein the alkaline material is potassium carbonate.

* * * * *